United States Patent
Sievert et al.

(10) Patent No.: US 7,319,542 B2
(45) Date of Patent: Jan. 15, 2008

(54) DOCUMENT REHABILITATION

(75) Inventors: Otto K. Sievert, Oceanside, CA (US); Lawrence J. Gutkowski, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1001 days.

(21) Appl. No.: 10/283,679

(22) Filed: Oct. 29, 2002

(65) Prior Publication Data

US 2004/0080764 A1    Apr. 29, 2004

(51) Int. Cl.
  *H04N 1/60* (2006.01)
  *H04N 1/62* (2006.01)
  *H04N 1/38* (2006.01)
  *G06K 9/40* (2006.01)

(52) U.S. Cl. .................. 358/1.9; 358/518; 358/537; 358/531; 382/275; 382/254

(58) Field of Classification Search .............. 358/1.9, 358/500, 518, 3.09, 3.12, 454–458, 463–464, 358/537, 531; 382/164, 175, 162, 167, 275, 382/173, 224, 180, 282–283, 254
See application file for complete search history.

(56) References Cited

U.S. PATENT DOCUMENTS

| | | |
|---|---|---|
| 4,571,071 A | 2/1986 | Bothner |
| 4,711,553 A | 12/1987 | Watanabe |
| 4,843,427 A | 6/1989 | Ibuchi |
| 4,855,765 A | 8/1989 | Suzuki et al. |
| 5,105,266 A | 4/1992 | Telle |
| 5,132,786 A | 7/1992 | Ishiwata |
| 5,202,935 A | 4/1993 | Kanamori et al. |
| 5,216,498 A * | 6/1993 | Matsunawa et al. ........ 358/500 |
| 5,473,736 A | 12/1995 | Young |
| 5,489,921 A | 2/1996 | Dorff et al. |
| 5,684,932 A * | 11/1997 | Shu ........................... 358/1.9 |
| 6,025,862 A | 2/2000 | Thompson |
| 6,035,058 A | 3/2000 | Savakis et al. |
| 6,173,072 B1 | 1/2001 | Linder |
| 6,594,401 B1 * | 7/2003 | Metcalfe et al. ............ 382/275 |
| 6,995,866 B2 * | 2/2006 | Feng et al. .................. 358/1.9 |

OTHER PUBLICATIONS

European Search Report dated Aug. 31, 2005.

* cited by examiner

*Primary Examiner*—Charlotte M. Baker

(57) ABSTRACT

A method of document rehabilitation typically includes providing an original document having a set of desirable markings that are substantially achromatic, and a set of undesirable markings, and generating an image file that includes color data corresponding to the original document. A transform filter may be applied to the image file so that the color data for each undesirable marking is mapped to a non-reproduced color, and the color data for each desirable marking is unchanged.

19 Claims, 3 Drawing Sheets

DOCUMENT REHABILITATION

BACKGROUND

Most pre-printed documents, including many forms, handouts, school assignments, and publications, are typically printed with black characters on a white background. Colored marks that may be made on such documents might later be considered undesirable. A child, for example using a colored crayon or marker, may mark upon a document. Alternatively, an error might be made in filling out a tax return form or a loan application using a blue pen. Attempting to remove or obscure such markings using correction fluid, or by 'striking out' the error, generally produces a messy and unprofessional looking document, and may even render the document illegible. However, unless a clean copy of the original document is available, the marked-upon copy must be used, potentially causing frustration and/or embarrassment. It would be useful to provide a convenient mechanism to rehabilitate such documents, so that they could be used, or reused. It would also be useful to be able to remove such markings from coloring sheets, or other children's activity sheets, so that such documents could be reused, thereby reducing the expense of purchasing additional copies.

SUMMARY

A method of document rehabilitation typically includes providing an original document having a set of desirable markings that are substantially achromatic, and a set of undesirable markings, and generating an image file that includes color data corresponding to the original document. A transform filter may be applied to the image file so that the color data for each undesirable marking is mapped to a non-reproduced color, and the color data for each desirable marking is unchanged.

DETAILED DESCRIPTION

Figure 1:
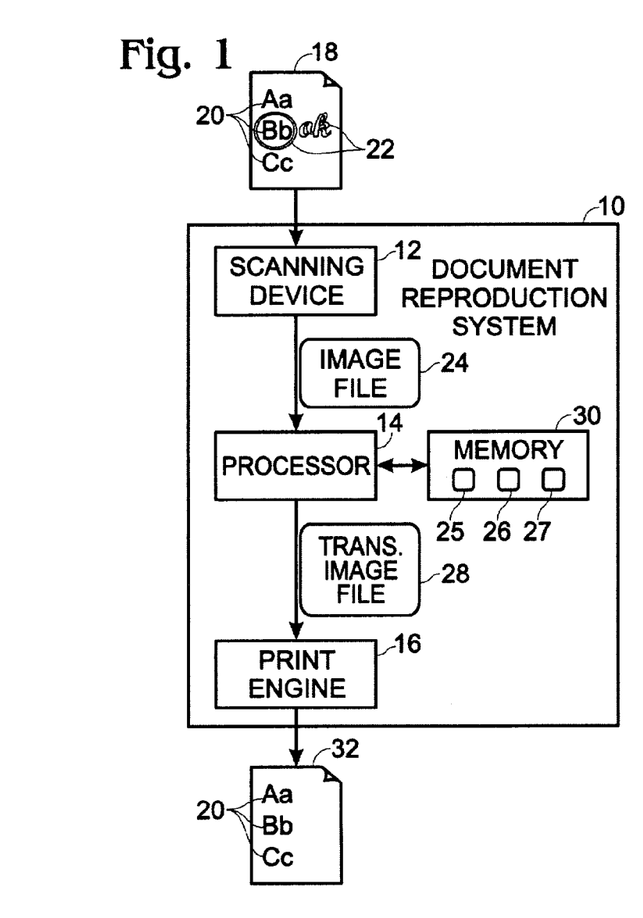
FIG. 1 is a schematic diagram of a document reproduction system according to an embodiment of the invention.

Referring to FIG. 1, a document reproduction system 10 is shown that is capable of executing a method of document rehabilitation according to an embodiment of the present invention. As indicated, the document reproduction system 10 may include a scanning device 12, a processor 14 coupled to the scanning device, and a print engine 16 coupled to the processor and capable of applying at least one colorant to a print medium.

As used herein, rehabilitation of a document includes the reproduction of a document, either electronically or as a hard copy, with the removal of selective document content. The document rehabilitation may include the preservation of the original markings of a pre-printed form, the removal of some original document markings, and/or the preservation of some added document markings, among other types of rehabilitation.

Figure 2:
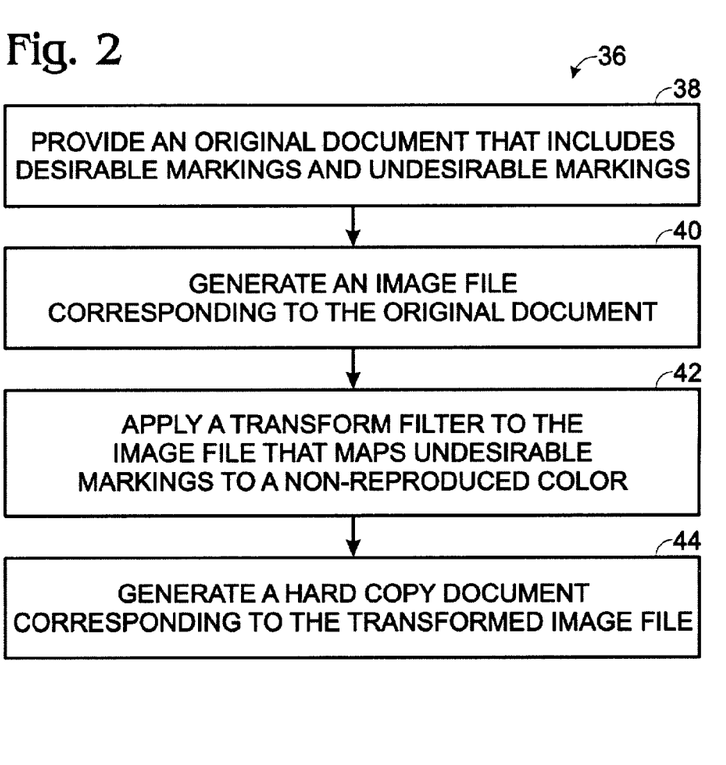
FIG. 2 is a flowchart depicting a method of document rehabilitation, according to an embodiment of the invention.

The document reproduction system may be configured to execute a method of document rehabilitation, as shown generally in flowchart 36 of FIG. 2. The method includes providing an original document that includes both desirable markings and undesirable markings, as indicated at 38, generating an image file that corresponds to the original document, as indicated at 40, applying a transform filter to the image file that maps undesirable markings to a non-reproduced color but preserves the color data of desirable markings, as indicated at 42. The method optionally includes generating a hard copy document that corresponds to the transformed image file, as indicated at 44.

More particularly, scanning device 12 of the document reproduction system may be configured to receive an original document 18 that includes desirable markings 20 that typically are substantially achromatic, and undesirable markings 22 that may or may not be substantially achromatic. As used herein, substantially achromatic includes colors that appear neutral or nearly neutral to the human eye. Substantially achromatic colors are typically shades of black, gray, and white that possess little or no hue, or that are sufficiently dark that they are perceived as black or nearly black. Typically, desirable markings include markings that are substantially black and/or substantially gray. Colors that are substantially achromatic may include, for example, colors included within a transfer filter as shown in one of FIGS. 4, 5, and 6.

From such markings, the scanning device may generate an image file 24 that corresponds to original document 18. In particular, image file 24 may include color data that substantially corresponds to the content of original document 18. Any scanning device capable of receiving an original document and converting it to an electronic image file that contains the color data of the original document is a suitable scanning device for the purposes of document reproduction system 10. The scanning device may be, for example, a scanner associated with a personal computer, a scanning unit that is incorporated in a copier device, a digital camera, or a photodiode array, among other scanning devices.

Referring still to FIG. 1, it will be noted that processor 14 may be coupled to the scanning device, and may be configured to receive image file 24 to apply a transform filter 25, 26, or 27 to the image file. The transform filter typically corresponds to a mathematical operation performed on the color data of the image file that leaves desirable (typically substantially achromatic) color data unchanged, but maps undesirable (typically chromatic) color data to a selected non-reproducing color. Processor 14 may be the processing unit of a computer associated with both a scanner and a printer. Alternatively, processor 14 may be a processing unit incorporated in a copier device. Receiving the image file and applying the transform filter may include additional processing steps, such as translating image data from one color space to another color space, normalizing the image data, and/or other data manipulation.

Appropriate transform filters may be stored in a memory 30 coupled to processor 14. As will be appreciated, memory 30 may include a plurality of distinct transform filters 25, 26, and 27. Processor 14 may thus be configured to analyze the content of the original document and select an appropriate transform filter based on preprogrammed criteria. Alternatively, the document reproduction system may include a user interface so that a user may select a particular transform filter for the processor to use in carrying out the document rehabilitation method of the invention. Whether selected automatically or selected by the user, the transform filter may be selected based upon the content of the original document, the characteristics of a given transform filter, or both.

Application of the transform filter by the processor may generate a transformed image file 28 that includes color data corresponding to the desirable markings 20, but with color data corresponding to the undesirable markings 22 mapped to a non-reproducing color. A non-reproducing color may be defined as a color that is not applied to the print medium by print engine 16. For example, where the medium is white, the non-reproducing color for print engine 16 may be white. In this case although color data corresponding to markings that are substantially white may be considered achromatic color data and preserved in the transformed image file, image file color data corresponding to white may still not be actively printed by print engine 16. Alternatively, the non-reproducing color may be transparent, such that image data coded as transparent is not reproduced. As non-reproducing colors are literally not applied to the selected medium during imaging, the method of FIG. 2 may be suitable for document rehabilitation using non-white media.

After application of the selected transform filter, image file 28 may be saved to memory 30, or output using any of a variety of output devices, including without limitation a monitor, a print engine, a hard disk, a magnetic diskette, or an optical disk. Where the image file is saved to memory or output to a memory device, the image file may be further viewed or manipulated using any of a variety of graphics applications known in the art. Alternatively or in addition, the image file may be transmitted electronically before or instead of further manipulation or printing. For example, the image file may be transmitted via a network, such as a local area network, or a wide area network, such as the Internet. The image file may also be included in a facsimile transmission.

As shown in FIG. 1, where the image file 28 is sent to a print engine 16, either directly or indirectly, the print engine may be configured to generate a hard copy 32 corresponding to transformed image file 28. Desirable markings 20 typically are preserved. As undesirable markings 22 have been mapped to a non-reproducing color, they are typically not reproduced by the print engine. Accordingly, hard copy 32 typically is substantially free of such markings. Sending the transformed image file to the print engine may include one or more additional processing steps in order to convert the image file into appropriate print engine commands for generating the desired hard copy. Such processing steps vary from print engine to print engine, and may vary even between similar print engine types.

Print engine 16 may include an electrophotographic print engine, an inkjet print engine, a plotter, or any other collection of components configured to deposit a desired image onto the selected medium. The colorant applied by the print engine may include ink, toner, or any suitable substance that includes one or more dyes, pigments, or colorants that may be applied to the selected media. Typically, the desired colorant is substantially achromatic (e.g. black), but any other colorant of any desired color or colors may be used to reproduce the transformed image file. Similarly, the medium may include any of a variety of substrates, including plain paper, coated paper, glossy paper, or transparencies, among others, and the media may be available in sheets, rolls, or any other appropriate and useful physical format.

Figure 3:
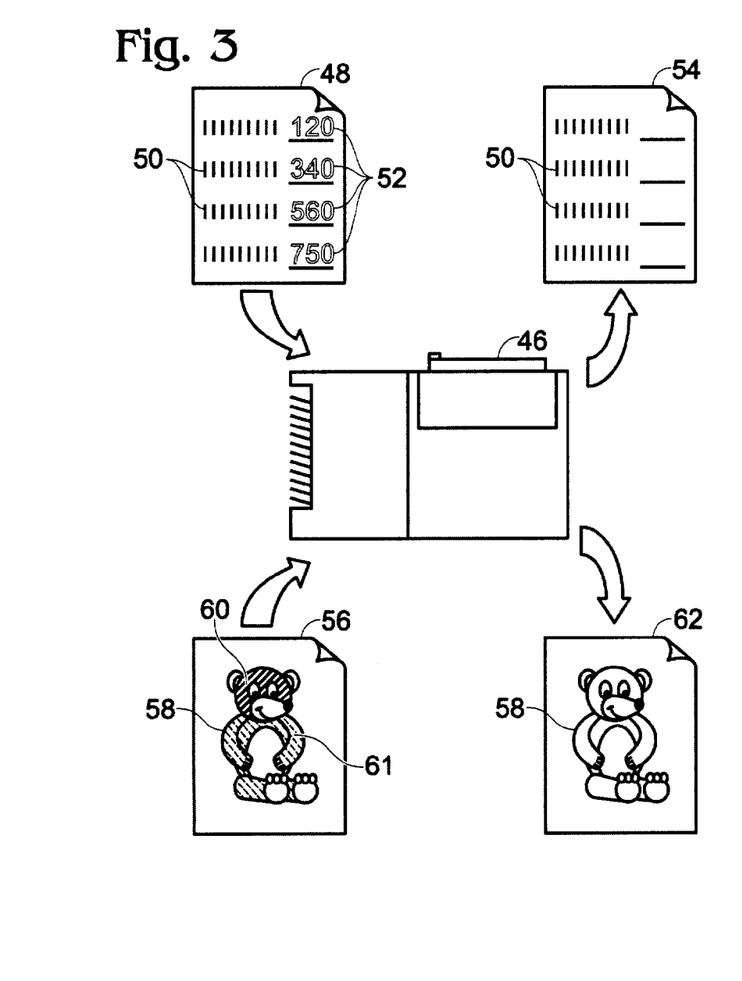
FIG. 3 is a schematic representation of the rehabilitation of a form and a coloring sheet, respectively, according to selected embodiments of the invention.

Examples of selected types of document rehabilitation that may be accomplished using the method herein described are depicted schematically in FIG. 3. Representative document reproduction system 46 takes the form of a copier configured to execute a method of document rehabilitation according to an embodiment of the invention. Original document 48 typically is a preprinted form that includes both preprinted desirable markings 50 and added undesirable markings 52. As used herein, a form may be a printed or typed document having one or more spaces for the insertion of required or requested information, such as a financial form, job application, or homework handout, among others. In FIG. 3, document 48 is a form that has been completed with the insertion of markings 52. Where a clean version of document 48 is desired, document 48 may be inserted into photocopier 46 with the selection of a rehabilitation mode. The rehabilitation mode may be selected by the user via a user interface incorporated in photocopier 46. The selection of the rehabilitation mode may include selection of a particular transform filter from among a plurality of available transform filters. Alternatively, the selection of an appropriate rehabilitation mode and/or transform filter may be automated, and performed by the processor based upon identifiable content of the original document.

As discussed above, document 48 may be scanned, converted to image data, and the appropriate transform filter may be applied to the image data. A clean document 54 may then be generated using the transformed image data that substantially preserves desirable markings 50, but that is substantially free of undesirable markings 52. Clean document 54 typically appears substantially similar to preprinted form 48 (before undesirable markings 52 were applied), and can be reused for a similar or different purpose.

Alternatively, document reproduction system 46 may be used to rehabilitate an original document 56 that is a marked-up and/or filled-in coloring sheet. Coloring sheet 56, as is common for coloring sheets or coloring books, includes a line drawing 58 suitable for coloring in or otherwise illustrating with colored crayons, markers, or paints. Line drawing 58 has been marked-up and/or filled in using a plurality of colored markings 60 and 61, where each color may be the same or different. By inserting coloring sheet 46 into photocopier 46 with selection of an appropriate rehabilitation mode, a clean, or rehabilitated, coloring sheet 62 may be produced that retains line drawing 58 but that is substantially free of undesired markings 60 and 61. Clean coloring sheet 62 may then be reused. Similarly, the document reproduction system of the invention may be useful for removing unintended marks and erasing errors from a variety of different document types.

In another particular embodiment of the invention, the original document is a math sheet where the math problems are recorded in black, while the answers are marked, for example, in red. Where the math sheet is copied without rehabilitation, both the problems and the answers are reproduced, for example to provide to a teacher. However, where the math sheet is copied with a document rehabilitation method as described above, reproduced math sheets may be substantially free of the marked answers, for example to provide to one or more students.

Image data may be represented with reference to the coordinates of a particular color space. A color space is typically a mathematical construction that permits color information to be described numerically and/or plotted graphically. Various color spaces may be references to color values such as hue or color; lightness, brightness, value, or reflectance; and vividness, saturation, or chroma, among others.

Selected color spaces include HVC (Munsell) color space, RGB color space, HSV color space, HSL color space, YCC color space, XYZ color space, L*a*b* color space, L*u*v* color space, Lhs color space, Lhc color space, YXY color space, CMY color space, or CMYK color space, among others. These color spaces are typically characterized by the use of independent axes that define selected color values, as set out in Table 1 below for selected color spaces:

TABLE 1

Commonly used color models

| Color Model | Axis 1 | Axis 2 | Axis 3 |
|---|---|---|---|
| RGB | red intensity | green intensity | blue intensity |
| HVC | hue | value | chroma |
| HSV | hue | saturation | value |
| HSL | hue | saturation | lightness |
| L*a*b* | lightness | red/green balance | yellow/blue balance |
| Lhs | lightness | hue | saturation |
| Lhc | lightness | hue | chroma |
| CMY | cyan | magenta | yellow |

Color data incorporated in an image file that is subjected to a transform filter, as described herein, typically corresponds to coordinates in a selected color space. The transform filter thus may selectively map the selected color data from one set of coordinates to another set of coordinates. Any transform filter that selectively preserves substantially desirable (typically achromatic) color data and maps undesirable color data to a non-reproduced color is a suitable transform filter for the purposes of the embodiments of the invention. Although any given transform filter may correspond to a particular set of mathematical operations, a particular transform filter may also be represented by a volume in relevant color space in order to simplify the visualization of the function of the transform filter.

L*a*b* color space (more properly referred to as 1976 CIE L*a*b* Space) is a device-independent color space in which lightness is separate from hue. The central vertical axis in L*a*b* space represents lightness (signified as L*) whose values run from 0 (black) to 100 (white). The color axes, a* and b*, range from positive to negative. On the a* axis, positive values indicate amounts of red while negative values indicate amounts of green. On the b* axis, yellow is positive and blue is negative. Where both axes are simultaneously zero, the resulting color is a neutral color (white, gray, or black).

For the purposes of illustrating the embodiments of the invention, the exemplary transform filters described below are discussed with respect to CIE L*a*b* color space. Substantially equivalent transform filters may be formulated for use with color data coordinates utilizing other color spaces. The shape of such a substantially equivalent transform filter is mathematically predictable starting from values in L*a*b* color space for one of skill in the art. For example, values in CIE L*a*b* color space may be converted to values in CIE L*h*c* color space using the following relationships:

$$L^* = L^*$$

$$c^* = \sqrt{a^{*2} + b^{*2}}$$

$$h^* = \arctan\left(\frac{b^*}{a^*}\right)$$

A variety of useful transform filters may be formulated, each of which may be suitable for carrying out the document rehabilitation method as described herein. A particular exemplary transform filter 70 suitable for preservation of substantially achromatic color data is depicted graphically in FIG. 4. Transform filter 70 corresponds to a substantially cylindrical volume in L*a*b* color space, the cylinder having a height 72 and a radius 74. The transform filter volume is defined such that color data coordinates falling within the volume are preserved, while color coordinates falling outside the volume are mapped to a non-reproduced color (e.g. transparent). The axis of symmetry of transform filter 70 is shown coincident with the L* axis, and the transform filter volume includes L* values equal to 0. The transform filter therefore substantially preserves the black and gray color values commonly found in scanned images of forms and other documents. Height 72 of the transform filter volume determines the shades of gray that are preserved. That is, as the transform filter height is increased, increasingly lighter shades of gray are preserved. In a particular example, a transform filter having a height that preserves values from L*=0 to L*=100 would preserve all gray scales from black to white.

Figure 4:
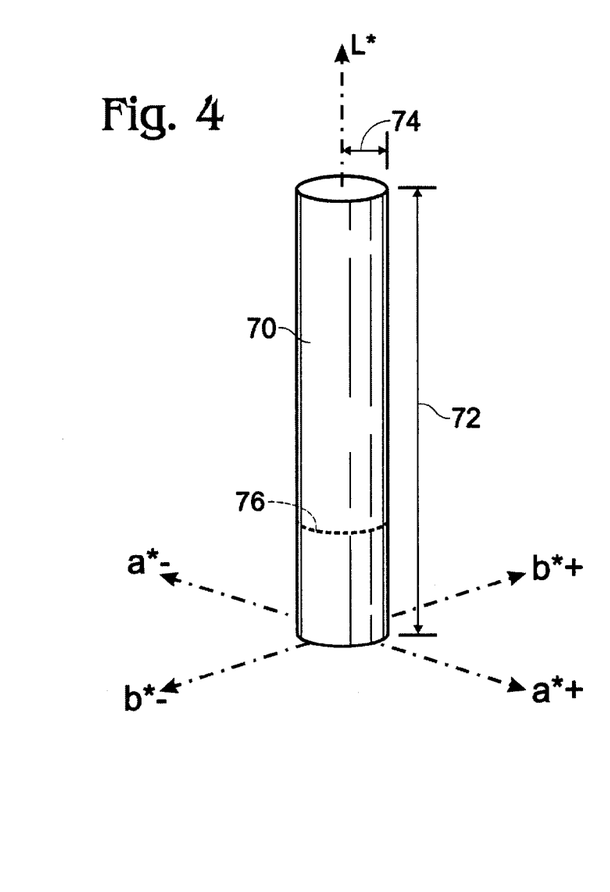
FIG. 4 is a graphical representation of a transform filter useful in document rehabilitation according to an embodiment of the invention.

The size of radius 74 of the transform filter determines the acceptance limit of colors that will be preserved versus colors that will be removed by mapping to a non-reproduced color. The cylinder radius, α, may be expressed as $\sqrt{a^{*2}+b^{*2}}$. A larger diameter cylinder volume (for example α=50) may preserve some colorful elements, while a smaller diameter cylinder volume (for example α=0.001) may result in the removal of some effectively black and gray elements from the image file. Generally useful filtering quality may be obtained with a filter having a radius α that has a value of between about 2 and about 6, inclusive (where the transform filter cylinder includes L* values of between about 0 and about 100, inclusive). Although transform filter 70 is depicted as a regular cylinder, it is to be understood that embodiments of the present invention may include transform filters having cross-sections that may be substantially circular, substantially elliptical, or any other appropriate shape for performing the desired color data transform. For example, the cross-section of the transform filter volume may substantially correspond to a regular or irregular polygon, such as a hexagon.

Where a user wishes to specifically differentiate between substantially gray markings and substantially black markings, the height of the transform filter may be adjusted. For example, application of a transform filter having a decreased height (for example as indicated by dashed line 76 in FIG. 4) may include only color data that is substantially black, with the removal of all lighter gray markings. Such a transform filter may be useful in removing undesirable gray markings from a document. For example, pencil marks might be removed from an original document using such a truncated cylindrical filter volume.

While a substantially cylindrical transform filter may be effective for preserving neutral and nearly-neutral color data, in many real world applications even substantially achromatic markings in the original document may become slightly more chromatic due to the effect of inherent noise in the scanning process, various instrumental limitations, optical effects, or other factors. In particular, during the scanning process some low lightness chroma values may be artificially inflated. In such cases a more sophisticated transform filter, such as a transform filter that is not strictly cylindrical, may be desirable in order to provide additional sophistication in distinguishing desirable and undesirable markings.

A suitable transform filter that permits a fixed amount of noise in the original color data may be approximated by applying a fixed amount of noise to achromatic color data in an initial color space, translating the resulting points to L*a*b* space, and using the translated points to define the transform filter volume.

For example, a set of achromatic points in RGB color space (R, G, B) may be selected where R=G=B (where the color space has NTSC primaries and an illuminant C white point). That is, a set of points such as (0, 0, 0), (0.1, 0.1, 0.1), (0.2, 0.2, 0.2) etc, for a plurality of R, G, B values between 0 and 1. A selected degree of artificial "noise", or chromatic shifting, may be simulated by assigning an error factor, $\epsilon$, in the RGB color data. The error factor may vary from, for example, ±0.01 units to ±0.1 units in RGB color space. In one aspect of the invention, the error factor is selected to be less than or equal to ±0.05 units in RGB color space. Application of the error factor to the neutral RGB color data may then result in a set of "noisy" data points (R+$\epsilon_r$, G+$\epsilon_g$, B+$\epsilon_b$).

The set of noisy RGB data points is typically first translated to XYZ color space using an exemplary transform matrix T, as shown below:

$$T = \begin{bmatrix} 60.7 & 29.9 & 0.0 \\ 17.4 & 58.7 & 6.6 \\ 20.1 & 11.4 & 111.7 \end{bmatrix}$$

Application of transform matrix T to the RGB data results in a set of "noisy" XYZ color data, as shown below:

$$\{R+\epsilon_r, G+\epsilon_g, B+\epsilon_b\}T = \{X+\epsilon_X, Y+\epsilon_Y, Z+\epsilon_Z\}$$

The XYZ color data may then be normalized, for example with respect to a white point. An appropriate white point in XYZ space for color data normalization is $$\{X_n, Y_n, Z_n\} = \{98.2, 100.0, 118.3\}$$

Figure 5:
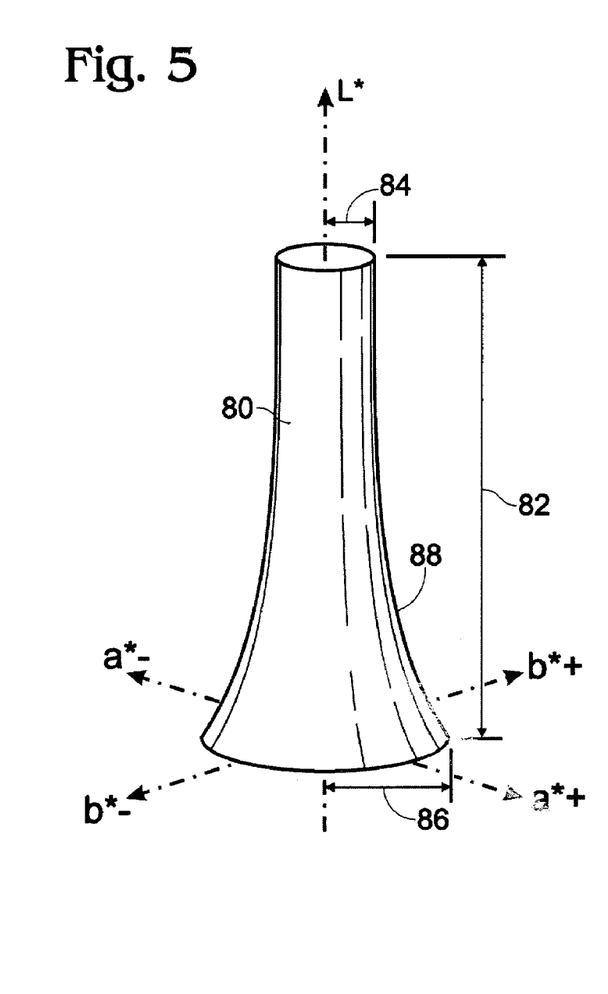
FIG. 5 is a graphical representation of an alternative transform filter useful in document rehabilitation according to an embodiment of the invention.

A set of "noisy" color data points in L*a*b* color space may therefore be created by normalizing the XYZ data points and translating them to L*a*b* space. An appropriate set of transform equations below may be used to perform the translation:

$$L^* = 116 \, (F_Y) - 16$$

$$a^* = 500 \, (F_X - F_Y)$$

$$b^* = 200 \, (F_Y - F_Z)$$

where the functions $F_X$, $F_Y$, and $F_Z$ may be defined as follows:

where $\left(\frac{X}{X_n}\right) > 0.008856$, $F_X = \left(\frac{X}{X_n}\right)^{1/3}$ where $\left(\frac{X}{X_n}\right) \leq 0.008856$, $F_X = 7.787\left(\frac{X}{X_n}\right) + \left(\frac{16}{116}\right)$ -continued where $\left(\frac{Y}{Y_n}\right) > 0.008856$, $F_Y = \left(\frac{Y}{Y_n}\right)^{1/3}$ where $\left(\frac{Y}{Y_n}\right) \leq 0.008856$, $F_Y = 7.787\left(\frac{Y}{Y_n}\right) + \left(\frac{16}{116}\right)$ where $\left(\frac{Z}{Z_n}\right) > 0.008856$, $F_Z = \left(\frac{Z}{Z_n}\right)^{1/3}$ where $\left(\frac{Z}{Z_n}\right) \leq 0.008856$, $F_Z = 7.787\left(\frac{Z}{Z_n}\right) + \left(\frac{16}{116}\right)$ The resulting data points in L*a*b* color space may be approximated by a transform filter such as transform filter 80, as depicted graphically in FIG. 5. Filter 80 appears as an inverted funnel having a height 82, an upper radius 84, a lower radius 86, and a curvature 88. The added width at the base of the funnel (at low L* values) may accommodate a selected amount of noise in the L*a*b* color space. The transform filter volume may be generally defined by an upper radius 84 having a value $\alpha$ between about 2 and about 6, inclusive, and L* values of between about 0 and about 100, inclusive, as for the cylindrical transform filter described above. However, the transform filter volume may be further defined by a lower radius 86 having a value $\gamma$ that is typically less than about 50 and greater than the value of the upper radius, $\alpha$. In one particular example, effective filtering may be achieved using a transform filter volume having a lower radius, $\gamma$, of between about 2 and about 30, inclusive. Funnel curvature 88 may be largely dictated by the set of parameters used to generate the shape of the transform filter, as discussed above, and typically substantially corresponds to the degree of noise introduced, and the particular mathematical color space conversions utilized, in creating and/or manipulating the transform filter. As discussed above, although transform filter 80 may be substantially funnel-shaped, variations of transform filter 80 having an elliptical, lobed, or regular or irregular polygonal cross sections may also be suitable for the purposes of the invention.

By selecting the values of the error factor $\epsilon$ to correspond to the chromatic shifting exhibited by a particular instrument, transform filters may be created that are specific for a given device, and that take into account the limitations of a particular scanning device, illumination source, electronic processing, and/or other sources of noise in the color data. As will be understood by one of skill in the art, a variety of alternative color spaces may be used in formulating the transform filter, and alternative transform functions and/or normalization factors may be applicable to particular data sets and particular color spaces.

Although the transform filter depicted in FIG. 5 may eliminate selected sources of error, typically error due to signal noise, as the base of the funnel volume becomes larger, additional undesirable markings in dark colors, such as dark blue or dark purple, may be erroneously included within the resulting transform filter volume and therefore preserved in the transformed image file. To avoid including such color data, transform filter 80 may be modified by creating one or more exclusionary clefts in the filter volume to exclude such dark chromatic color data from inclusion. An example of this type of transform filter is depicted as transform filter 90 of FIG. 6. Transform filter 90 has a height 92, an upper radius 94, a lower radius 96, and a curvature 98, all substantially similar to that of transform filter 80 described above. However, the volume of transform filter 90 additionally incorporates a cleft 100, having a cleft angle 102 and a cleft depth 104.

Figure 6:
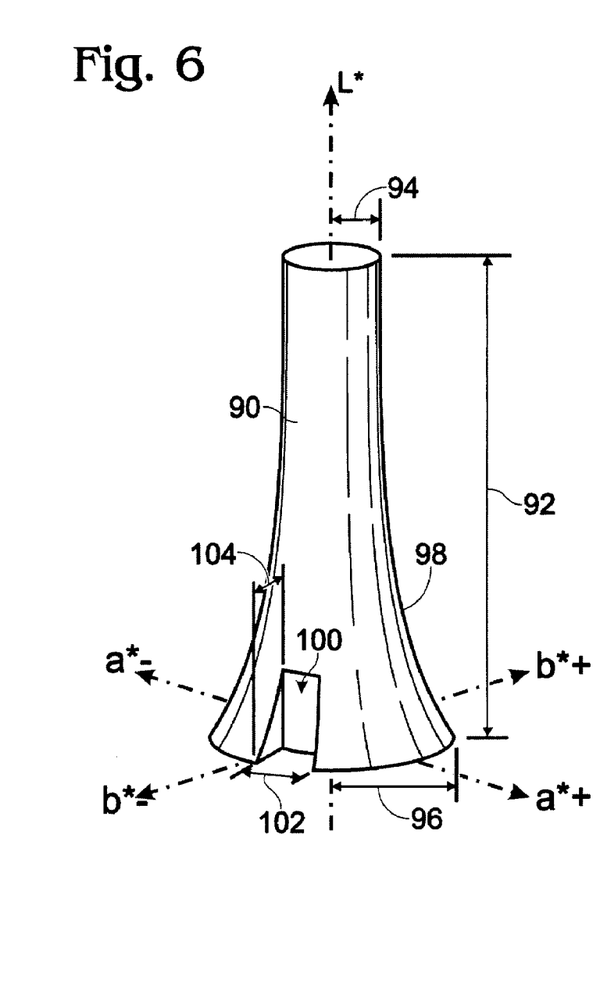
FIG. 6 is a graphical representation of another alternative transform filter useful in document rehabilitation according to an embodiment of the invention.

Cleft angle 102 may be selected so as to exclude color data corresponding to hues such as blues and purples that may appear to the human eye as nearly neutral when sufficiently dark. Increasing cleft angle 102 results in a larger range of hues being excluded from preservation in the transformed image file. For example, a narrow cleft may exclude only a particular shade of blue marking, while a wider cleft may exclude all blue, purple, and indigo markings. Cleft angle 102 may have a value, κ, in the range of about 0 to about 30°, inclusive.

Similarly, cleft depth 104 may be selected so as to exclude color data that are not sufficiently close to a neutral color. A deep cleft may exclude shades of blue that are nearly gray, while a shallow cleft may include substantially blue-tinted color data. Cleft depth 104 may have a value, v, in the range of about 2 to about 30, inclusive.

Although the above transform filters have been discussed in some detail, it should be apparent that a variety of transform filters may be used in the present method, including transform filters having a variety of additional shapes and sizes, depicted in a variety of different color spaces, as defined by a variety of mathematical properties, without departing from the scope of the invention as claimed.

For example, embodiments of the invention may include a copier having a plurality of preselected document rehabilitation modes, corresponding to the application of various and distinct transform filters offering various levels of discrimination of color data. A user may then place an original document on the copier, select the type of document rehabilitation desired (for example inclusion or exclusion of pencil markings, inclusion or exclusion of dark blue markings, as discussed above), and initiate document reproduction. The rehabilitated document may then be generated automatically.

Document reproduction system 10 offers significant advantages over the tedious and often difficult image manipulation previously required in order to rehabilitate document images using specialized software. The quality of the color removal may be selective, typically by selection of the desired transform filter, requires no training or expertise, and may be readily executed by selection of a single button, for example on a copying device.

Appropriate software instructions to effect the methodology of an embodiment of the invention may be employed via a computer-readable medium. A "computer-readable medium," as used herein, can be any means that can contain, store, communicate, propagate, or transport such instructions for use by or in connection with an imaging system or imaging apparatus. The computer-readable medium can be, without limitation, an electronic, magnetic, optical, electromagnetic, infrared, or semiconductor system, apparatus, device, or propagation medium. More specific examples of a computer-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), and a portable compact disc read-only memory (CDROM) (optical). Note that the computer-readable medium could even be paper or another suitable medium upon which the program may be printed, as the program can be electronically captured, via for instance optical scanning of the paper or other medium, then compiled, interpreted or otherwise processed in a suitable manner if necessary, and then stored in a computer memory.

The instruction on the computer-readable media may represent an upgrade to document reproduction software previously available, in order to permit the execution of the above-described method, or to execute an upgraded version of such software.

Although the present invention has been shown and described with reference to the foregoing operational principles and embodiments, it will be apparent to those skilled in the art that various changes in form and detail may be made without departing from the spirit and scope of the invention. The present invention is intended to embrace all such alternatives, modifications and variances that fall within the scope of the appended claims.

What is claimed is:

1. A document rehabilitation method, comprising:
providing an original document that includes a set of desirable markings that are substantially achromatic, and a set of undesirable markings;
generating an image file that includes color data corresponding to the original document; and
applying a transform filter to the image file, such that the color data for each undesirable marking is mapped to a non-reproduced color, and the color data for each desirable marking is substantially unchanged;
wherein applying the transform filter includes applying a transform filter corresponding to a substantially cylindrical volume in L*a*b* color space having an axis that is substantially coincident with the L* axis, and thereby preserving color data falling within the cylindrical volume of the transform filter, and mapping color data falling outside the cylindrical volume of the transform filter to the non-reproduced color.

2. The method of claim 1, further comprising generating a hard copy document corresponding to the transformed image file, such that the hard copy document substantially reproduces the desirable markings of the original document, and is substantially free of the undesirable markings.

3. The method of claim 1, wherein applying the transform filter includes mapping the color data of each undesirable marking to white.

4. The method of claim 1, wherein applying the transform filter includes mapping the color data of each undesirable marking to transparent.

5. The method of claim 1, wherein generating an image file that includes color data includes scanning the original document, and converting the scanned image into an image file that includes luminance-chrominanca color data.

6. The method of claim 1, wherein applying the transform filter preserves desirable markings that are substantially black.

7. The method of claim 1, wherein providing the original document includes providing a form document that includes desirable markings that are original form markings, and undesirable markings.

8. The method of claim 7, further comprising generating a rehabilitated form document that substantially reproduces the original form markings, and is substantially free of the undesirable markings.

9. The method of claim 1, wherein providing the original document includes providing a coloring sheet that includes a first set of marking that make up a line drawing, and undesirable markings.

10. The method of claim 9, further comprising generating a rehabilitated coloring sheet that substantially reproduces the original line drawing, and is substantially free of the undesirable markings.

11. A document rehabilitation method, comprising:
providing an original document that includes a set of desirable markings that are substantially achromatic, and a set of undesirable markings;
generating an image file that includes color data corresponding to the original document; and
applying a transform filter to the image file, such that the color data for each undesirable marking is mapped to a non-reproduced color, and the color data for each desirable marking is substantially unchanged;
wherein applying the transform filter includes applying a transform filter corresponding to a substantially funnel-shaped volume in L*a*b* color space having an axis that is coincident with the L* axis, a base that includes L values equal to 0, and a top that includes L* values less than or equal to 100, and thereby preserving color data falling within the funnel-shape volume of the transform filter and mapping color data falling outside the funnel-shaped volume of the transform filter to a non-reproduced color.

12. The method of claim 11, wherein the funnel-shaped volume of the transform filter Includes an upper radius of $\alpha$, wherein $2 \leq \alpha \leq 6$ when $L^* =100$, and a lower radius of $\gamma$, wherein $2 \leq \gamma \leq 30$.

13. A document rehabilitation method, comprising:
providing an original document that includes a set of desirable markings that are substantially achromatic, and a set of undesirable markings;
generating an image file that includes color data corresponding to the original document; and
applying a transform filter to the image file, such that the color data for each undesirable marking is mapped to a non-reproduced color, and the color data for each desirable marking is substantially unchanged;
wherein applying the transform filter includes applying a transform filter corresponding to a substantially funnel-shaped volume in L*a*b* color space having an axis that is coincident with the L* axis, a base that includes L* values equal to 0, a top that includes L* values less than or equal to 100, and a cleft in the base of the funnel-shaped volume excluding blue and purple colors from the interior of the funnel-shaped volume of the transform filter, and thereby preserving color data falling within the funnel-shaped volume of the transform filter and mapping color data falling outside the funnel-shaped volume of the transform filter to a non-reproduced color.

14. The method of claim 13, wherein the funnel-shaped volume of the transform filter includes an upper radius of a, wherein $2 \leq \alpha \leq 6$ when $L^*=100$, and a lower radius of $\gamma$ wherein $2 \leq \gamma \leq 30$, and a cleft having a cleft angle of k, wherein k is in the range of about 0°-30°, and the cleft having a depth of v, wherein $2 \leq v \leq 30$.

15. An apparatus for document rehabilitation, comprising:
a scanner configured to generate an image file that includes color data from an original document;
a processor configured to receive the image file from the scanner and to apply a transform filter to the image file to generate a transformed Image file, wherein the transform filter is configured to preserve substantially achromatic color data while mapping other color data to a non-reproduced color, the transform filter corresponding to a substantIally cylIndrIcal volume in L*a*b* color space having an axis that is substantially coincident with the L* axIs, thereby preserving color data falling within the cylindrical volume of the transform filter, and mapping color data falling outsIde the cylindrical volume of the transform filter to the non-reproduced color.

16. The apparatus of claim 15, further comprising a memory coupled to the processor, the memory including plural user-selectable transtorm filters.

17. The apparatus of claim 15, further comprising a print engine configured to generate a hard copy corresponding to the transformed image file.

18. The apparatus of claim 17, wherein the apparatus is a copier.

19. A computer-readable storage medium readable by a processor, having embodied therein a program of commands executable by the processor to:
generate an image file corresponding to an original document, wherein the image file includes color data corresponding to desirable markings in at least one desirable color and undesirable markings in at least one undesirable color;
apply a transform filter to the image file to produce a transformed image file, where the transform filter appears in L*a*b* color space as one of a substantially cylindrical volume, an inverted funnel volume, or an inverted funnel volume having a cleft, such that color data falling within the transform filter volume are preserved, and color data falling outside the transform filter volume are mapped to a non-reproduced color, such that the at least one undesirable color in the image file is mapped to a non-reproduced color in the transformed image file, and the at least one desirable color is substantially unchanged;
where each desirable color is a substantially achromatic color.

* * * * *

UNITED STATES PATENT AND TRADEMARK OFFICE
CERTIFICATE OF CORRECTION

PATENT NO. : 7,319,542 B2  
APPLICATION NO. : 10/283679  
DATED : January 15, 2008  
INVENTOR(S) : Otto K. Sievert et al.

It is certified that error appears in the above-identified patent and that said Letters Patent is hereby corrected as shown below:

In column 10, line 52, in Claim 5, delete "chrominanca" and insert -- chrominance --, therefor.

In column 11, line 19, in Claim 11, before "values equal" delete "L" and insert -- L* --, therefor.

In column 11, line 26, in Claim 12, delete "Includes" and insert -- includes --, therefor.

In column 11, line 53, in Claim 14, delete "a" and insert -- α --, therefor.

In column 12, line 2, in Claim 14, delete "γwherein" and insert -- γ wherein --, therefor.

In column 12, line 10, in Claim 15, delete "Image" and insert -- image --, therefor.

In column 12, line 14, in Claim 15, delete "substantially cyllndrical" and insert -- substantially cylindrical --, therefor.

In column 12, line 16, in Claim 15, delete "axIs" and insert -- axis --, therefor.

In column 12, line 18, in Claim 15, delete "outsIde" and insert -- outside --, therefor.

In column 12, line 23, in Claim 16, delete "transtorm" and insert -- transform --, therefor.

Signed and Sealed this

Nineteenth Day of August, 2008

JON W. DUDAS  
*Director of the United States Patent and Trademark Office*